United States Patent [19]

Spaugh

[11] Patent Number: 4,542,709
[45] Date of Patent: Sep. 24, 1985

[54] HIGHWAY WARNING DEVICE

[76] Inventor: Randall E. Spaugh, R.R. 1, Box 135, Oakley, Ill. 62552

[21] Appl. No.: 652,226

[22] Filed: Sep. 20, 1984

[51] Int. Cl.$^4$ ............................ E01F 9/00; G08B 3/00
[52] U.S. Cl. ................................ 116/63 P; 116/63 R; 404/15
[58] Field of Search ................ 116/63 R, 63 P, 28 R, 116/67 R, DIG. 16, DIG. 17; 404/9–11, 14–16

[56] References Cited

U.S. PATENT DOCUMENTS

| 1,707,951 | 4/1929 | Schleicher | 404/10 |
| 1,766,073 | 6/1930 | Hartzler et al. | 404/10 |
| 1,833,124 | 11/1931 | Rand | 404/10 |
| 2,774,323 | 12/1956 | Kirk | 116/63 R |
| 4,445,803 | 5/1984 | Dixon | 404/10 |

FOREIGN PATENT DOCUMENTS

| 1235337 | 5/1960 | France | 116/63 R |
| 276805 | 9/1927 | United Kingdom | 404/9 |

Primary Examiner—Charles Frankfort
Assistant Examiner—W. Morris Worth
Attorney, Agent, or Firm—Norman B. Rainer

[57] ABSTRACT

A warning device adapted to be laid flat upon a roadway produces an audible warning sound when contacted by the wheels of a moving vehicle. The device is comprised of a mat of flexible resilient material having an elongated configuration, and a series of rigid panels upwardly positioned upon the mat. The warning sound is produced when the panels are downwardly deflected, and thereby contact each other in domino fashion. By virtue of its specialized construction, the device can be folded and rolled into a compact storage state which can be contained in the trunk of an automobile.

2 Claims, 5 Drawing Figures

HIGHWAY WARNING DEVICE

BACKGROUND OF THE INVENTION

This invention concerns warning means for alerting the driver of an automotive vehicle to potentially hazardous driving conditions, and more particularly relates to a warning device interactive between a vehicle and the roadway upon which the vehicle travels.

Most highway warning systems in present use rely upon visually perceivable characteristics such as lights, flares, flags, signs, barriers, lane markers and the like. Although effective under mild weather conditions permitting good visibility, such visually perceived devices lose effectiveness under conditions of fog, snow, dust storms and heavy rain, particularly during nighttime hours. Certain easily developed lightweight highway markers are easily blown away in moderate winds, and occupy considerable storage volume.

Highway warning systems which rely upon audibly perceivable characteristics such as horns and sirens find use particularly by vehicles as a means for alerting other vehicles. Specially grooved highway surfaces are in use which produce sound and vibration when the tires of the vehicle roll over the grooves. Such grooved surfaces, however, are fixed installations which do not warn of any unusual hazard of a transient nature but instead indicate special road conditions such as an impending sharp curve, which always require more than the usual amount of driving caution. The grooved surfaces also lose effectiveness when coated with light accumulations of less than one inch of ice or snow. Another limitation of grooved roadways is that such expedient is applicable only with costly concrete constructions that are impractical on all but major highways.

It is accordingly an object of the present invention to provide a portable warning device capable of deployment upon a roadway of any surface characteristics.

It is another object of this invention to provide a device as in the foregoing object which produces sound and mechanical vibration when the wheels of a vehicle roll thereover.

It is a further object of the invention to provide a device of the aforesaid nature unaffected by moderate winds and light accumulations of ice or snow.

It is still another object of the present invention to provide a device of the aforesaid nature capable of being quickly deployed from a compact storage state.

An additional object of this invention is to provide an improved warning device of the aforementioned nature of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by an improved highway warning device which comprises:

(a) a mat having substantially flat upper and lower surfaces, fabricated of a flexible resilient composition and having an elongated rectangular periphery characterized in having a long length direction and shorter width direction, and (b) a series of substantially rigid panels of uniform elongated rectangular periphery characterized in having a long length direction and shorter height direction, said panels being attached in a parallel array to said mat, extending upwardly in their height direction from the upper surface of said mat, extending in their length direction in the length direction of said mat, and spaced apart in the width direction of said mat a uniform distance of less than the height of said panels, whereby (c) when the device is placed with the lower surface of the mat resting upon a roadway surface and the length direction oriented transversely to the direction of vehicular travel, passage of the wheels of a vehicle across said array of panels causes momentary downward deflection of said panels, resulting in a domino-type contact therebetween which produces a discernible sound.

In preferred embodiments the ratio of the length to width directions of the mat will be in the range of about 2.0 to 4.0. The mat may be provided with apertures which further minimize the possibility that high velocity air currents will displace the device from its intended position upon the roadway. The device may further be constructed in a manner permitting folding in two halves to shorten the lengthwise direction and thereby facilitate storage in the trunk of an automobile.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
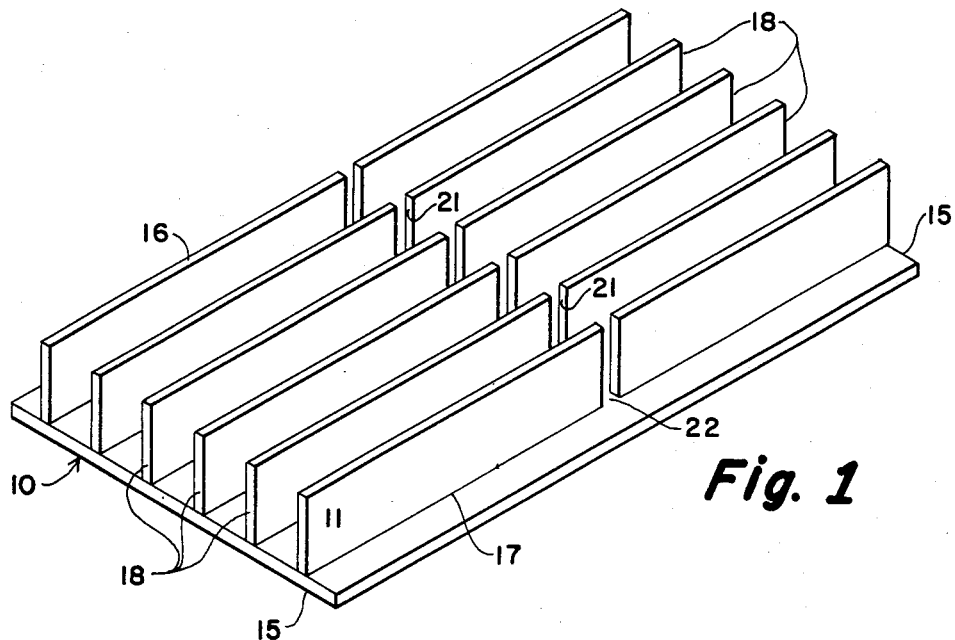
FIG. 1 is a perspective view of an embodiment of the warning device of the present invention.
Figure 3:
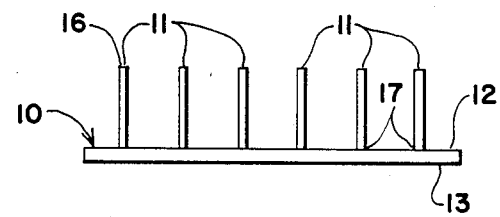
FIG. 3 is an end view thereof.
Figure 2:
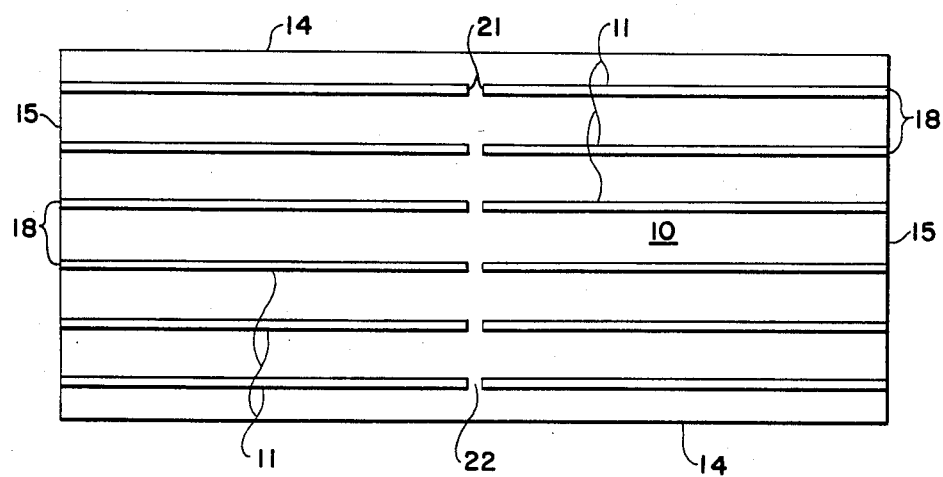
FIG. 2 is a top plan view of the embodiment of FIG. 1.

Referring to FIGS. 1 to 3, an embodiment of the device of this invention is shown comprised of mat 10 and a series of identical panels 11 attached to and extending vertically upward from said mat.

The mat is defined by substantially flat parallel upper and lower surfaces 12 and 13, respectively, and a rectangular periphery comprised of long edges 14 and short edges 15. The thickness of the mat, measured perpendicularly between said upper and lower surfaces, ranges preferably between about $\frac{1}{8}''$ and $\frac{1}{2}''$. The long edges, which define the length direction of the mat, are preferably between about 3 and 8 feet in length. The short edges, which define the width direction of the mat, are between about 1 and 4 feet in length. The ratio of the length to width directions of the illustrated mat is about 3.0.

The mat is fabricated of a resilient polymer material not subject to embrittlement at low temperatures. Suitable materials include synthetic and natural rubbers, elastomeric polymers derived from butadiene, isoprene and chloroprene, ionomer resins, vinyl copolymers, and polyurethanes.

Each panel has an elongated rectangular periphery defined by upper edge 16, lower edge 17, outer edges 18, and facing or inner edges 21. The lower edges of the panels are attached to the mat in a manner whereby the panels extend vertically upward from the upper surface of the mat in a parallel array. The height of each panel, measured perpendicularly between upper and lower edges thereof, is between 1 and 5 inches. The thickness of the panels may range from about ¼" to 1". The lateral spacing between the panels is smaller than their heights. In the illustrated embodiment, each panel is comprised of two aligned halves separated in the length direction by a folding gap 22 having a width, measured in the length direction, of between about 1 and 3 inches. The folding gap enables the device to be folded in half so that the lower surfaces of the halves are in abutment. The overall length of the panels, measured between outer end edges 18, is substantially the same as the length of the mat. Because of its significant length, it is unlikely that the wheels of a vehicle will miss contacting the properly deployed device.

Figure 5:
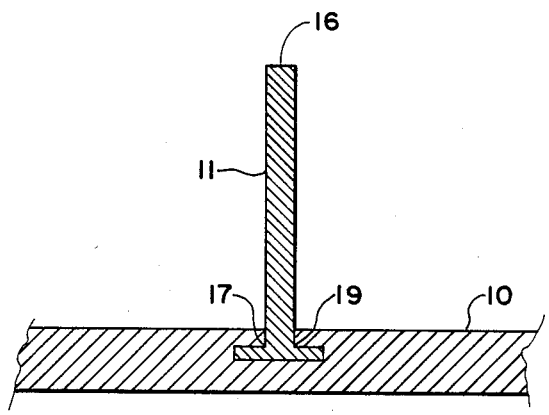
FIG. 5 is an enlarged fragmentary end view of the device.

The panels are fabricated of a rigid material having sufficient toughness to resist fracture upon impact at low temperatures. Suitable materials include metals such as aluminum, fiber-reinforced composites utilizing cross-linked epoxy and polyester compositions, and engineering grade moldable resins such as polycarbonates, polyamides, and polymethylene acetals. The bottom edge of the panel may be associated with the mat by virtue of fasteners, or by embedment means wherein the mat has been cast around the properly positioned panels. An example of an embedment means is shown in FIG. 5, wherein a T-shaped footing 19, integral with said panel, is locked within the mat.

Figure 4:
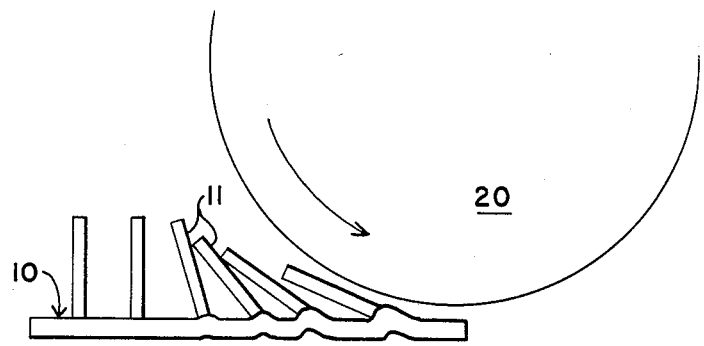
FIG. 4 is an end view illustrating the action of the device when the tire of a vehicle rolls thereupon.

In operation, as shown in FIG. 4, when the tire 20 of a vehicle rolls transversely across the parallel array of panels, each panel in turn is downwardly deflected. Such deflection causes contact between adjacent panels, and such contact produces an audible sound. In addition, the rolling movement of the tire across the panels produces a vibration within the vehicle that can be felt by the driver. Said audible and vibratory effects serve to alert the driver of potential road hazards. The device may also be distinctly colored so that under conditions of favorable visibility they additionally provide a visual warning.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

I claim:

1. An improved portable highway warning device comprising:
   (a) a mat having substantially flat upper and lower surfaces, fabricated of a flexible resilient composition and having an elongated rectangular periphery characterized in having a long length direction and shorter width direction, and
   (b) a series of substantially rigid panels of uniform elongated rectangular periphery characterized in having a long length direction and shorter height direction, said panels being attached in a parallel array to said mat, extending upwardly in their height direction from the upper surface of said mat, extending in their length direction in the length direction of said mat, and spaced apart in the width direction of said mat a uniform distance less than the height of said panels, whereby
   (c) when the device is placed with the lower surface of the mat resting upon a roadway surface and the length direction oriented transversely to the direction of vehicular travel, passage of the wheels of a vehicle across said array of panels causes momentary downward deflection of said panels, resulting in a domino-type contact therebetween which contact produces a discernible sound.

2. The device of claim 1 wherein each panel is comprised of two aligned halves separated in the length direction by a gap having a width, measured in the length direction, of between about 1 to 3 inches, thereby enabling the device to be folded in half so that the lower surfaces of the halves are in abutment.

* * * * *